United States Patent
Stengel et al.

(10) Patent No.: US 6,458,885 B1
(45) Date of Patent: *Oct. 1, 2002

(54) FAST DRYING CLEAR COAT COMPOSITION

(75) Inventors: Sandra R. Stengel, Brunswick, OH (US); Charles M. Kania, Natrona Heights, PA (US); James A. Claar, Apollo, PA (US); Stephen J. Thomas, Aspinwall, PA (US); Kenneth J. Stachel, Shaler, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,919

(22) Filed: May 29, 1998

(51) Int. Cl.⁷ .............................. C08G 18/67
(52) U.S. Cl. .................. 524/507; 525/123; 528/75
(58) Field of Search .................. 525/123; 524/507; 528/75

(56) References Cited

U.S. PATENT DOCUMENTS

| | | | |
|---|---|---|---|
| 2,857,354 A | 10/1958 | Fang | 260/33.2 |
| 3,178,380 A | 4/1965 | Porret | 260/21 |
| 3,541,055 A | 11/1970 | Malamet et al. | 260/78.4 |
| 3,549,583 A | 12/1970 | Nagata et al. | 260/37 |
| 4,145,513 A | 3/1979 | Dalibor | 528/75 |
| 4,177,183 A | 12/1979 | Dalibor | 260/31.4 |
| 4,220,679 A | 9/1980 | Backhouse | 427/401 |
| 4,988,766 A * | 1/1991 | Das et al. | 525/123 |
| 5,279,862 A | 1/1994 | Corcoran et al. | 427/407.1 |
| 5,286,782 A | 2/1994 | Lamb et al. | 524/507 |
| 5,314,953 A | 5/1994 | Corcoran et al. | 525/123 |
| 5,354,797 A * | 10/1994 | Anderson et al. | 524/285 |
| 5,466,860 A | 11/1995 | Flosbach et al. | 560/43 |
| 5,545,824 A | 8/1996 | Stengel et al. | 524/590 |
| 5,639,828 A * | 6/1997 | Briggs et al. | 525/208 |
| 5,665,434 A * | 9/1997 | Mass et al. | 427/393.5 |
| 5,670,600 A * | 9/1997 | Nienhaus et al. | 528/75 |
| 5,759,630 A * | 6/1998 | Vosskuhl et al. | 427/393.5 |

FOREIGN PATENT DOCUMENTS

| | | |
|---|---|---|
| FR | 2452500 | 3/1979 |
| GB | 12 16 479 | 12/1970 |
| GB | 1419634 | 12/1975 |

* cited by examiner

*Primary Examiner*—Ana Woodward
(74) *Attorney, Agent, or Firm*—Jacques B. Miles; Dennis G. Millman

(57) ABSTRACT

A fast-drying coating composition intended primarily as an automotive clear coat contains (A) 25 to 80 weight percent of an acrylic polyol which is the polymerization product of unsaturated monomers of which 0.5 to 15 percent by weight (based on resin solids weight of the monomers) is an acrylate having the structure:

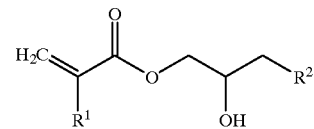

where $R^1$=H or $CH_3$,

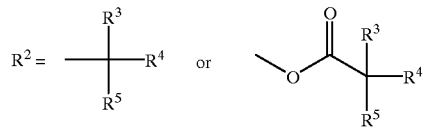

$R^3$ is H or an alkyl group, $R^4$ is an alkyl group, and $R^5$ is an alkyl group containing at least four carbon atoms; and (B) 20 to 75 weight percent of a curing agent reactive with hydroxyl groups, particularly polyisocyanates.

13 Claims, No Drawings

FAST DRYING CLEAR COAT COMPOSITION

BACKGROUND OF THE INVENTION

This invention relates to a curable coating composition particularly adapted for use as a clear top coat on automobiles to provide fast drying speed. More particularly, the type of coating involved is that which includes as the primary binder constituents an acrylic polyol and a curing agent, typically a polyisocyanate.

Automobiles are sometimes coated with a plurality of layers, typically a pigmented base coating composition onto which is subsequently applied a different top coating composition. The top coat is frequently referred to as "clear," that is, substantially without pigment, but minor amounts of pigments or other materials that affect the appearance of the automobile may be included. Acrylic polyol based top coatings are particularly useful for their compatibility with a wide variety of base coating compositions.

A major factor in the productivity of an automobile painting operation is the speed with which the top coat dries to a condition that is no longer tacky. "Drying" in this context does not entail completing the curing reactions, but rather an initial surface hardening due primarily to solvent evaporation. Although acrylic polyol based coating compositions have a desirable combination of properties, it has been desired to shorten the dry time of this type of coating. It was known to increase drying speed by selecting monomers that increase the $T_g$ (glass transition temperature) of the acrylic polyol. In particular, increasing the methacrylate monomer content of the acrylic polyol was known as a way to increase $T_g$ (U.S. Pat. Nos. 5,279,862 and 5,324,953). Attempts to further increase drying speed, especially under ambient conditions, have heretofore not been as successful as desired because increased drying speed was generally been accompanied by an undesirable degradation in the appearance of the final coating. It is therefore an objective of the present invention to shorten drying times of the acrylic polyol/isocyanate type of coating composition while continuing to provide the other properties required of automotive applications.

French Patent Publication No. 2 452 500 discloses generally the use of glycidyl compounds reacted with acrylic acid or methacrylic acid as a component of acrylic polyols.

SUMMARY OF THE INVENTION

The rapid-drying coating composition of the present invention contains as the primary binder components (A) 50 to 80 weight percent of an acrylic polyol more fully described below, and (B) 20 to 50 weight percent of a curing agent reactive with hydroxyl groups, such as a polyisocyanate. The weight percentages are based on the total resin solids weight of (A) plus (B). The particular acrylic polyol of (A) is the free radical reaction product of vinyl monomers, of which 0.5 to 15 percent by weight (based on total resin solids weight of the monomer mixture from which acrylic polyol A is made) is an acrylic compound having the structure:

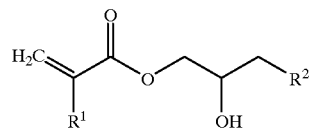

(I)

where $R^1$=H or CH$_3$,

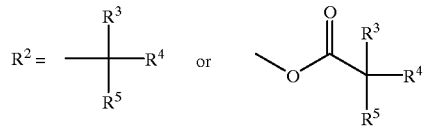

$R^3$ is H or an alkyl group,
$R^4$ is an alkyl group, and
$R^5$ is an alkyl group containing at least four carbon atoms.

DETAILED DESCRIPTION

The coating composition of the present invention comprises two components that are maintained as separate packages until immediately prior to use. One component (A) contains acrylic polyol, and the other component (B) contains a curing agent reactive with the hydroxyl groups in the first component. Preferably, the curing agent includes a polyisocyanate, but may comprise other known curing agents reactive with hydroxyl groups such as melamine-formaldehyde compounds and anhydrides. The reaction product of components (A) and (B) comprises the primary film-forming portion of the coating composition. Optimized commercial embodiments of the coating composition may optionally include additional ingredients such as diluents (e.g., solvents and/or reactive resinous diluents), catalysts, ultraviolet light absorbers or stabilizers, and pigments as are conventional in the art. These additional ingredients may be included in either or both components. Such acrylic based coating compositions are particularly useful for automotive finishes, especially as clear top coats over a pigmented base coat. The clear coatings are very advantageous as clear coats over a variety of base coats. In a particular commercial application of the present invention, the coating composition is intended for use in refinishing automobiles, wherein drying of the film-forming polymer is effected at or near ambient temperatures.

The acrylic polyol is made by addition polymerization of at least two types of unsaturated monomers, at least one of which includes the structure (I) above. Preferably, additional hydroxyl functionality is provided by including in the monomer mixture another monomer having a hydroxyl group. Most commonly, several other monomers are included to provide desired physical properties to the final coating.

Based on total resin solids weight of the monomer mixture, the acrylic polyol of the present invention may be synthesized from a monomer combination that comprises: (a) 0.5 to 15 weight percent of a compound of structure (I); (b) 0 to 45 weight percent hydroxy-containing unsaturated monomers such as hydroxyalkyl acrylates and methacrylates; and (c) from 40 to 98 weight percent of other ethylenically unsaturated copolymerizable materials such as non-functional alkyl acrylates, alkyl methacrylates, and vinyl aromatic monomers. The preferred weight percentages of these monomers are 1 to 10 percent of (a), 20 to 40 percent of (b), and 50 to 80 percent of (c).

The monomer (a), i.e., the compound of structure (I), comprises an acrylate or methacrylate in which the esterifying group is the residue of a glycidyl group which is, in turn, bound to a terminal group that includes a branched alkyl group, preferably a tertiary alkyl group. At least one of the alkyl branches in the terminal group may include a chain four or more carbon atoms in length. Preferably the branched alkyl group includes at least eight carbon atoms. A branched alkyl structure in the terminal group is believed to be particularly advantageous for attaining optimal results with the present invention. Surprisingly, the substantial chain length of monomer (a) and its inclusion of alkyl groups of substantial length permit the acrylic polyols into which it is polymerized to have very rapid drying rates without a substantial loss of hardness in the final coating that might otherwise be expected of such a structure. Good gloss and flow properties are also attained with the preferred embodiments.

Monomer (a) may be synthesized by reacting acrylic or methacrylic acid with a monoepoxide having substantial hydrocarbon chain length, such as commercially available epoxidized alpha olefins of the formula:

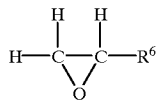

where $R^6$ includes a branched alkyl group having at least 6 carbon atoms, preferably at least 8 carbon atoms. Polyepoxies such as certain of the commercially available family of EPON products may be used if partially defunctionalized to form monoepoxies. Epoxies with little or no aromatic content are preferred for automotive coatings. Preferably, the terminal group in the esterifying group of monomer (a) itself includes an ester group, in which case the monomer may be the reaction product of acrylic acid or methacrylic acid and CARDURA E (a glycidyl ester of Versatic acid sold by Shell Chemical Company). Versatic acid is a proprietary, synthetic blend of isomers of saturated tertiary alkyl monoacid having nine to eleven carbon atoms. The (meth)acrylic and CARDURA E reaction yields the following structure:

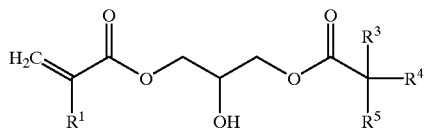

where the groups are as defined above. Alternatively, monomer (a) with an ester-containing terminal group may be produced from the reaction of glycidyl acrylate or glycidyl methacrylate with a long chain organic acid such as Versatic acid, neodecanoic acid, or isostearic acid. The branched structures of the preferred acids are believed to be advantageous.

Examples of suitable hydroxy-containing unsaturated monomers of group (b) in the monomer mixture employed to make acrylic polyol (A) are vinyl monomers such as hydroxyalkyl acrylates and methacrylates, including the acrylic acid and methacrylic acid esters of ethylene glycol and propylene glycol. Typically, these acrylates and methacrylates have 2 to 6 carbon atoms in the alkyl group. Also useful are hydroxy-containing esters and/or amides of unsaturated acids such as maleic acid, fumaric acid, itaconic acid and the like.

Monomers of group (c) in the monomer mixture include a wide range of unsaturated compounds. Preferably the major portion of the group (c) monomers are vinyl monomers, more specifically alkyl, cycloalkyl, or aryl acrylates and methacrylates having 2 to 6 carbon atoms in the esterifying group. Examples of particularly useful monomers are methyl methacrylate and n-butyl methacrylate. Other monomers that may be considered useful include lauryl methacrylate, 2-ethylhexyl methacrylate, isobornyl methacrylate, and cyclohexyl methacrylate. An aromatic vinyl monomer frequently included is styrene. Other copolymerizable monomers which may optionally be included in the group (c) monomers are ethylenically unsaturated materials such as monoolefinic and diolefinic hydrocarbons, unsaturated esters of organic and inorganic acids, amides and esters of unsaturated acids, nitriles, and unsaturated acids. Examples of such monomers include 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate. It should be understood that monomer group (c) may include mixtures.

In addition to the film-forming components, other adjuvant resins such as polyesters can also be added to the formulation of the composition of the present invention. Usually, these polyesters are polyester polyols which are designed to be cured with a polyisocyanate. The polyesters are formed by the polyesterification of an organic polycarboxylic acid or its functional equivalent thereof with an organic polyol. Among the acids which can be used are phthalic acid, terephthalic acid, tetrahydrophthalic acid, hexa-hydrophthalic acid, azelaic acid and dimerized fatty acid including mixtures. Examples of suitable polyols are ethylene glycol, 1,4-butanediol, neopentyl glycol, trimethylpentanediol and trimethylolpropane including mixtures. Also, polycaprolactone-type polyesters may be employed which are formed from reaction of a cyclic lactone such a epsilon-caprolactone with a polyol or a hydroxy acid such as ethylene glycol and dimethylolpropionic acid.

In the practice of preferred embodiments of the invention, the curing agent of component (B) comprises a polyisocyanate curing agent which is capable of reacting with the active hydrogens in the acrylic polyol to give a thermosetting coating. A combination of two or more polyisocyanates is sometimes found to be useful.

Examples of polyisocyanates that may be used in component (B) are aliphatic, cycloaliphatic, and aromatic polyisocyanates, including mixtures thereof. Typically, the polyisocyanate is a diisocyanate, preferably an aliphatic isocyanate. Examples of suitable aliphatic diisocyanates include 1,4-tetramethylene diisocyanate and 1,6-hexamethylene diisocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable cycloaliphatic diisocyanates include 1,4-cyclohexyl diisocyanate, isophorone diisocyanate, 4,4'-methylene-bis-(cyclohexyl isocyanate). Triisocyanates such as TMXDI-IMP aliphatic triisocyanate available from Cytec Industries, Inc., can also be used. Isocyanurates and biurets of the diisocyanates described above can also be used. Preferably, the polyisocyanate curing agent of the present invention is an isocyanurate, such as the isocyanurate of hexamethylene diisocyanate, or blend of isocyanurates.

The amounts of acrylic polyol and polyisocyanate curing agent which are used in the practice of the invention are preferably adjusted so that the equivalent ratio of isocyanate groups to hydroxyl groups is within the range of 0.8:1 to 1.5:1, preferably slightly greater than 1:1. Isocyanate to hydroxyl equivalent ratios greater than this ratio are not preferred because hardness and durability of the resultant coating may suffer; whereas ratios lower than this ratio are not preferred because flexibility of the resultant coating may suffer.

Also present in preferred embodiments of the compositions intended for automotive coatings are constituents to resist the affect of solar ultraviolet radiation. These include ultraviolet light stabilizers and ultraviolet light absorbers, and preferably both are included. When they are included, effective amounts of ultraviolet light stabilizers and absorbers are each typically in the range of 0.01 to 5.0 percent by weight, preferably 1.5 to 2.5 percent by weight, the percentages based on the total weight of solids of the curing composition. A variety of ultraviolet light stabilizers well known to those skilled in the art can be used. Especially useful are the UV stabilizers and absorbers commercially available under the name TINUVIN® from Ciba-Geigy Company.

When formulated as automotive refinish coatings, the compositions of the present application include organic liquid diluent, typically in an amount of between 10 to 60 percent by weight of the total composition. Additional liquid diluent is commonly added at the point of use in the form of a viscosity reducer in accordance with the particular equipment and conditions at the paint shop, which may further increase the total solvent content. By liquid diluent is meant a volatile solvent or non-solvent which is removed after the coating is applied and which reduces viscosity sufficiently to permit control of coating thickness, flow, uniformity, and appearance in whatever coating application technique (viz., spraying) is used. Also, diluents assist in substrate wetting, resinous component compatibility, package stability, and coalescence or film formation. Examples of suitable diluents include aromatic hydrocarbons such as toluene and xylene, ketones such as methyl ethyl ketone and methyl isobutyl ketone.

Metal catalysts are used in the coating compositions of present invention for facilitating the cure of compositions containing hydroxyl and isocyanate groups. Preferably, the metal catalysts are formed from tin, cobalt, calcium and cesium, preferably from tin. Such metal catalysts are known in the art for accelerating the reaction of hydroxyl-containing organic molecules with isocyanates to form urethane groups. Representative of such catalysts are metal salts of carboxylic acids, diorganometallic oxides, mono- and diorganometallic carboxylates, and the like. Specific examples of such metal catalysts are calcium naphthanate, cesium naphthanate, cobalt naphthanate, dibutyl tin dilaurate, dibutyl tin diacetate, dibutyl tin octoate and dibutyl tin naphthanate. Such catalysts are used in curing polyisocyanate-polyol compositions in an amount selected to provide the particular performance level desired, and may range from 0 to 0.10 percent by weight of the solids content of such compositions. In preferred commercial embodiments, the amount of metal catalyst of the type disclosed above is typically in the range of 0.05 to 5.0 percent, the percentages based on the total weight of the solids of the curing compositions.

The film-forming compositions of the present invention are particularly adapted to be formulated into clear coating compositions. However, they could be formulated with pigments to form pigmented coating compositions. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake. The pigment content of the paint is usually expressed as the pigment-to-resin weight ratio. In the practice of the invention, when the film-forming coating compositions of the present invention contain a pigment, the pigment-to-resin weight ratios may be as high as 2:1 and for most pigmented coatings are within the range of 0.05 to 1:1.

The coating compositions of the present invention dry rapidly, with dust-free times of 15 to 20 minutes or less being attainable. Determination of dust-free time is described in the examples. Tack-free times (determined by thumb pressure) of some embodiments are on the order of 60 minutes to 75 minutes. The final films are smooth, flexible, hard, and durable. The coating compositions are particularly useful for application over a variety of aqueous and non-aqueous pigmented basecoats, both thermoplastic and thermosetting. Because of their fast drying rate, they are especially useful in automotive refinish applications.

The invention is further illustrated by the specific embodiments set forth in the examples. Examples 1 through 4 present a comparison of the invention with a composition disclosed in French Patent Publication No. 2 452 500. Example 1 relates to an acrylic polyol of the present invention, while Example 2 is a reproduction of an acrylic polyol in the French patent publication. Examples 3 and 4 are isocyanate-cured, two component coating compositions that include the acrylic polyols of Examples 1 and 2, respectively. The dust-free times reported in Table 1 demonstrate the superior dry speed of the present invention relative to the approach in the French patent. Example 5 is a preferred embodiment of a automotive refinish composition in accordance with the present invention, which includes the acrylic polyol of Example 1. All compositional values in the examples are in parts by weight unless indicated otherwise.

EXAMPLE 1

Polyol of this Invention

|  | Parts by weight |
|---|---|
| Hydroxyl propyl methacrylate | 30 |
| Methyl methacrylate | 25 |
| Styrene | 20 |
| n-Butyl methacrylate | 18 |
| CARDURA E/acrylic acid monomer | 5 |
| Acrylic acid | 1 |
| Di-t-amyl peroxide on monomer | 8 |
| t-Dodecyl mercaptan | 1 |

Peak Molecular Weight=4339
Weight Average Molecular Weight=4498
Number Average Molecular Weight=1422
60% solids

EXAMPLE 2

Comparative Polyol

|  | Parts by Weight |
|---|---|
| Hydroxyl propyl methacrylate | 24 |
| Methyl methacrylate | 15 |
| Styrene | 33 |
| n-Butyl methacrylate | 0 |
| CARDURA E | 20.8 |
| Acrylic acid | 6.1 |
| Di-t-amyl peroxide on monomer | 6 |

Molecular Weight peak=4034
Weight Average Molecular Weight=4048
Number Average Molecular Weight=1756
59% solids

EXAMPLE 3

Coating Composition of this Invention

|  | Formula Weight | Solid Resin |
|---|---|---|
| Component A | | |
| AROMATIC 100[1] | 13.00 | |
| Xylene | 13.00 | |
| Methyl isobutyl ketone | 10.00 | |
| TINUVIN 328[2] | 2.29 | 2.29 |
| TINUVIN 292[3] | 1.53 | 1.53 |
| Dibutyl tin dilaurate | 0.08 | 0.08 |
| BYK 306[4] | 0.78 | 0.09 |
| Acrylic polyol of Example 1 | 108.03 | 66.98 |
| Sub Total Component B | 148.70 | 70.97 |
| DCX8 urethane hardener[5] Reducer | 35.63 | 29.03 |
| DT-870 solvent blend[6] | 25.67 | |
| Total | 210.00 | 100.00 |

| % Wt Solid | VOC | Equivalents Ratio NCO/OH |
|---|---|---|
| 47.62 | 4.15 | 1.09 |

[1]Solvent blend available from Exxon Chemical Corp.
[2]Ultraviolet absorber available from Ciba-Geigy Co.
[3]Hindered amine light stabilizer from Ciba-Geigy Co.
[4]Silicone wetting agent and flow control additive from Byk Chemie USA.
[5]High solids hardener containing an isocyanurate of hexamethylenediisocyanate and methyl ethyl ketone, available from PPG Industries, Inc.
[6]Organic solvent blend available from PPG Industries, Inc.

EXAMPLE 4

Comparative Coating Composition

|  | Formula Weight | Solid Resin |
|---|---|---|
| Component A | | |
| AROMATIC 100 | 13.00 | |
| Xylene | 13.00 | |
| Methyl isobutyl ketone | 10.00 | |
| TINUVIN 328 | 2.29 | 2.29 |
| TINUVIN 292 | 1.53 | 1.53 |
| Dibutyl tin dilaurate | 0.08 | 0.08 |
| BYK 306 | 0.78 | 0.09 |
| Acrylic resin of Example 2 | 105.82 | 62.65 |
| Sub Total Component B | 146.50 | 66.63 |
| DCX8 urethane hardener Reducer | 40.94 | 33.37 |
| DT-870 solvent blend | 22.56 | |
| Total | 210.00 | 100.00 |

| % Wt Solid | VOC | Equivalents Ratio NCO/OH |
|---|---|---|
| 47.62 | 4.20 | 1.09 |

Each of the coating formulations of Examples 3 and 4 was tested for performance by application onto a substrate prepared as follows. The substrates were 32 gauge steel panels phosphate treated and precoated with electrocoat and primer (available from Advanced Coating Technologies, Inc., Hillsdale, Mich.; as APR24711), scuffed with 600 grit sandpaper (P400-213Q, Imperial Wetordry production paper, "A" weight, available from 3M, St. Paul, Minn.), wiped clean with DX 330 degreaser (available from PPG Industries, Inc., Pittsburgh, Pa.), and sealed with DP 40/DP 401/DT 870 (a sealer made by mixing 1 volume DP 40 epoxy primer with 1 volume DP 401 epoxy primer catalyst with ½ volume DT 870 reducer, all available from PPG Industries, Inc.). The sealed substrates were air-dried under ambient conditions for at least 1 hour before the example coatings were applied.

Over the base coat on each panel was then applied one of the clearcoat compositions of Examples 3 and 4. The coatings were applied with a Binks #62 spray gun at 50 pounds per square inch, at 72° F. and 40% relative humidity.

Dust free times were measured by dropping a cosmetic cotton ball from 5 inches above a coated panel, allowing the cosmetic cotton ball to lay 5 seconds on said coated panel, then turning the panel over. If cotton ball fell free from the coating, the panel was dust free and the dust time was recorded as the time from the application to the coatings until the time the cotton ball falls free.

TABLE 1

|  | DRY FILM THICKNESS (Mils) | DUST-FREE TIME (Minutes) |
|---|---|---|
| Example 3 | 2.8 ± .10 | 40 |
| Example 4 | 2.7 ± .09 | 65 |

EXAMPLE 5

Coating Composition of this Invention

|  | Formula Weight | Solid Resin |
|---|---|---|
| Component A | | |
| Methyl isobutyl ketone | 10.21 | |
| Methyl amyl ketone | 5.67 | |
| TINUVIN 328 | 0.85 | 0.85 |

-continued

| | | |
|---|---|---|
| TINUVIN 292 | 0.42 | 0.42 |
| Dibutyl tin dilaurate | 0.18 | 0.18 |
| BYK 306 | 0.35 | 0.04 |
| Acrylic polyol of Example 1 | 48.45 | 30.04 |
| Sub Total Component B | 66.12 | 31.53 |
| Methyl isobutyl ketone | 1.91 | |
| Dibutyl tin dilaurate | 0.03 | |
| Z4470 SN/BA[7] | 9.06 | 6.34 |
| HDT-LV[8] | 7.98 | 7.98 |
| Reducer | | |
| DT-870 solvent blend[6] | 14.89 | |
| Total | 100.0 | 45.89 |

| % Wt Solid | VOC | Equivalents Ratio NCO/OH |
|---|---|---|
| 45.89 | 4.19 | 1.08 |

[7]Isocyanurate of isophorone diisocyanate in a blend of aromatic solvents and butyl acetate commercially available from Bayer Corp.
[8]Isocyanurate of hexamethylene diisocyanate in methyl ethyl ketone commercially available from Rhone Poulenc.

The dry film thickness for the cured coating of Example 5 was 2.7 mils, and the dust-free time as measured by the cotton ball test was 19 minutes.

The invention has been described with reference to particular embodiments for the sake of disclosing the best mode of the invention, but it should be understood that other variations and modifications as would be known to those of skill in the art may be resorted to without departing from the scope of the invention as defined by the claims.

What is claimed is:

1. A non-aqueous coating composition comprising as the primary curable, film-forming components:

(A) 25 to 80 weight percent of an acrylic polyol having a number average molecular weight ranging from 1422 to 1756, which is the polymerization product prepared in the presence of a di-t-amyl derivative polymerization initiator of a combination of monomers comprising:
(a) 1 to 10 percent by weight of a compound of the structure

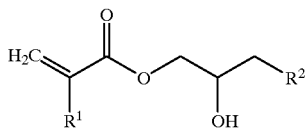

where $R^1$=H or $CH_3$,

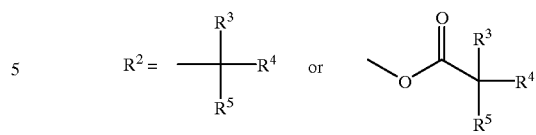

$R^3$ is H or an alkyl group,
$R^4$ is an alkyl group,
$R^5$ is an alkyl group containing at least four carbon atoms;
(b) 20 to 40 percent by weight hydroxy-containing vinyl monomers different from the monomer of (a); and
(c) from 50 to 80 percent by weight of ethylenically unsaturated copolymerizable materials not containing hydroxyl groups; the percentages by weight of (a), (b), and (c) being based on the total solid resin weight of the monomers of (a), (b), and (c); and
(B) 20 to 75 weight percent of a curing agent reactive with hydroxyl groups; wherein the weight percentages of (A) and (B) are based on the total resin solids weight of (A) plus (B); and
(C) organic diluent.

2. The composition of claim 1 wherein $R^3$, $R^4$, and $R^5$ contain a total of at least 8 carbon atoms.

3. The composition of claim 1 wherein curing agent (B) comprises at least one polyisocyanate.

4. The coating composition of claim 3 wherein at least one polyisocyanate of curing agent (B) is selected from the group consisting of isocyanurate of isophorone diisocyanate, isocyanurate of hexamethylene diisocyanate, and mixtures thereof.

5. The composition of claim 1 wherein the acrylic polyol (A) is separate from the curing agent (B).

6. The composition of claim 1 wherein the hydroxy-containing vinyl monomers of monomer component (b) comprise a hydroxyalkyl acrylates, hydroxyalkyl methacrylates, or combinations thereof.

7. The composition of claim 1 wherein the unsaturated copolymerizable monomer component (c) is selected from the group consisting of alkyl, cycloalky, and aryl acrylates and methacrylates, vinyl benzene compounds, and mixtures thereof.

8. The coating composition of claim 1 wherein said coating composition containing an acrylic polyol is a clear coat composition.

9. The coating composition of claim 1 wherein said coating composition contains a pigment.

10. The coating composition of claim 1 further including a metal-containing catalyst, organic diluent, and an ultraviolet light stabilizer, and an ultraviolet light absorber.

11. The coating composition of claim 1 wherein $R^3$, $R^4$, and $R^5$ are each alkyl groups.

12. The coating composition of claim 1 comprising 50 to 80 percent of component (A) and 20 to 50 percent of component (B), based on total resin solids weight of (A) plus (B).

13. The coating composition of claim 1 wherein the curable film-forming components consist essentially of (A) and (B).

* * * * *